US011608809B2

(12) United States Patent
Nakazono et al.

(10) Patent No.: US 11,608,809 B2
(45) Date of Patent: Mar. 21, 2023

(54) STARTUP METHOD OF FRANCIS TURBINE AND FRANCIS TURBINE

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Masahiko Nakazono, Kawasaki Kanagawa (JP); Takero Mukai, Yokohama Kanagawa (JP); Yoshitaka Arihara, Sodegaura Chiba (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 91 days.

(21) Appl. No.: 17/351,364

(22) Filed: Jun. 18, 2021

(65) Prior Publication Data

US 2021/0396204 A1 Dec. 23, 2021

(30) Foreign Application Priority Data

Jun. 19, 2020 (JP) .............................. JP2020-106298

(51) Int. Cl.
| | |
|---|---|
| *F03B 15/00* | (2006.01) |
| *F03B 15/08* | (2006.01) |
| *F03B 11/00* | (2006.01) |
| *F03B 3/18* | (2006.01) |

(52) U.S. Cl.
CPC ............ *F03B 15/005* (2013.01); *F03B 3/183* (2013.01); *F03B 11/004* (2013.01); *F03B 15/08* (2013.01); *F05B 2220/32* (2013.01); *F05B 2260/85* (2013.01); *F05B 2270/101* (2013.01); *F05B 2270/341* (2020.08)

(58) Field of Classification Search
CPC .. F03B 3/02; F03B 3/125; F03B 3/183; F03B 11/004; F03B 15/005; F03B 15/08; Y02E 10/20; F05B 2220/32; F05B 2260/85; F05B 2270/341; F05B 2270/101
See application file for complete search history.

(56) References Cited

U.S. PATENT DOCUMENTS 3,236,498 A * 2/1966 Kerensky ................ F03B 15/06
 415/164
3,309,057 A * 3/1967 Tonooka ............... F03B 15/005
 415/910

FOREIGN PATENT DOCUMENTS

JP H09-222069 A 8/1997

* cited by examiner

*Primary Examiner* — Christopher Verdier
(74) *Attorney, Agent, or Firm* — Foley & Lardner LLP

(57) ABSTRACT

A startup method of a Francis turbine according to an embodiment includes: a bypass-valve opening step of opening the bypass valve with the inlet valve closed; an inlet-valve opening step of opening the inlet valve after the bypass-valve opening step; and a first rotation-speed increasing step of increasing a rotation speed of the runner by opening the guide vane at an opening that is 50% or more of a maximum opening before a flow velocity of a swirling flow flowing around the runner reaches 90 m/sec.

5 Claims, 6 Drawing Sheets

STARTUP METHOD OF FRANCIS TURBINE AND FRANCIS TURBINE

CROSS REFERENCE TO RELATED APPLICATION

This application is based upon and claims the benefit of priority from Japanese Patent Application No. 2020-106298, filed on Jun. 19, 2020, the entire contents of which are incorporated herein by reference.

FIELD

Embodiments described herein relate generally to a startup method of a Francis turbine and a Francis turbine.

BACKGROUND

When a turbine of a Francis turbine is operated, water from an upper reservoir is guided from an inlet pipe to a casing through an inlet valve. The water having flown into the casing passes through stay vanes and guide vanes to be guided to a runner. A flow rate of the water is regulated by the guide vanes. The runner is driven in rotation by the water flowing into the runner, so that a generator connected to the runner via a main shaft is driven to generate electricity. Thereafter, the water flows out from the runner to be discharged to a lower reservoir or a tailrace through a draft tube. A bypass pipe bypassing the inlet valve is provided to reduce a pressure difference between the upstream side of the inlet valve and the downstream side of the inlet valve (inside the casing) so as to facilitate the opening and closing of the inlet valve. The bypass pipe is provided with a bypass valve.

Such a Francis turbine is usually started up as follows. In the rest state of the Francis turbine, the inlet valve, the bypass valve and the guide vanes are all closed. Under this state, the bypass valve is opened to increase a pressure in the casing up to about the same level as a pressure upstream of the inlet valve. Then, the inlet valve is opened to guide water into the casing. Following thereto, the guide vanes are opened at an opening within a range of 10% to 20%. Thus, the runner is driven in rotation by the water flowing thereinto, so that a rotation speed of the runner increases to reach a rated rotation speed.

However, when the guide vanes are opened at the opening within the above range upon startup of the Francis turbine, an annular flow path may be formed between the guide vanes and the runner in the radial direction. In this case, the water having passed through the guide vanes may flow through the annular flow path, creating a swirling flow around the runner. When the swirling flow collides with runner blades, a separation flow may occur. Particularly with a Francis turbine with a large head, the swirling flow becomes faster and a stronger separation flow may occur. At this time, a pressure inside the runner may decrease down to a saturated water vapor pressure or below. This causes the water to evaporate, so that water vapor bubbles are generated in the water. At the moment when the water vapor in the water vapor bubbles condenses, the pressure may abruptly increase. This may damage the runner because an impact load may be applied to the runner.

DETAILED DESCRIPTION

A startup method of a Francis turbine according to an embodiment is a startup method of a Francis turbine comprising an inlet valve provided to an inlet pipe that guides water to a casing, a bypass valve provided to a bypass pipe that bypasses the inlet valve and guides water to the casing, and a guide vane capable of regulating a flow rate of water to be guided to a runner provided in the casing. The startup method of a Francis turbine comprises: a bypass-valve opening step of opening the bypass valve with the inlet valve closed; an inlet-valve opening step of opening the inlet valve, after the bypass-valve opening step; and a first rotation-speed increasing step of increasing a rotation speed of the runner by opening the guide vane at an opening that is 50% or more of a maximum opening before a flow velocity of a swirling flow flowing around the runner reaches 90 m/sec.

In addition, a Francis turbine according to the embodiment comprises: a casing; an inlet pipe that guides water to the casing; an inlet valve provided to the inlet pipe; a bypass pipe that bypasses the inlet valve and guides water to the casing; a bypass valve provided to the bypass pipe; a runner provided in the casing; a guide vane capable of regulating a flow rate of water to be guided to the runner; and a control unit. The control unit controls the inlet valve, the bypass valve and the guide vane to perform: a bypass-valve opening step of opening the bypass valve with the inlet valve closed; an inlet-valve opening step of opening the inlet valve after the bypass-valve opening step; and a first rotation-speed increasing step of increasing a rotation speed of the runner by opening the guide vane at an opening that is 50% or more of a maximum opening before a flow velocity of a swirling flow flowing around the runner reaches 90 m/sec.

A startup method of a Francis turbine and a Francis turbine according to the embodiment of the present invention will be described herebelow with reference to the drawings.

Figure 1:
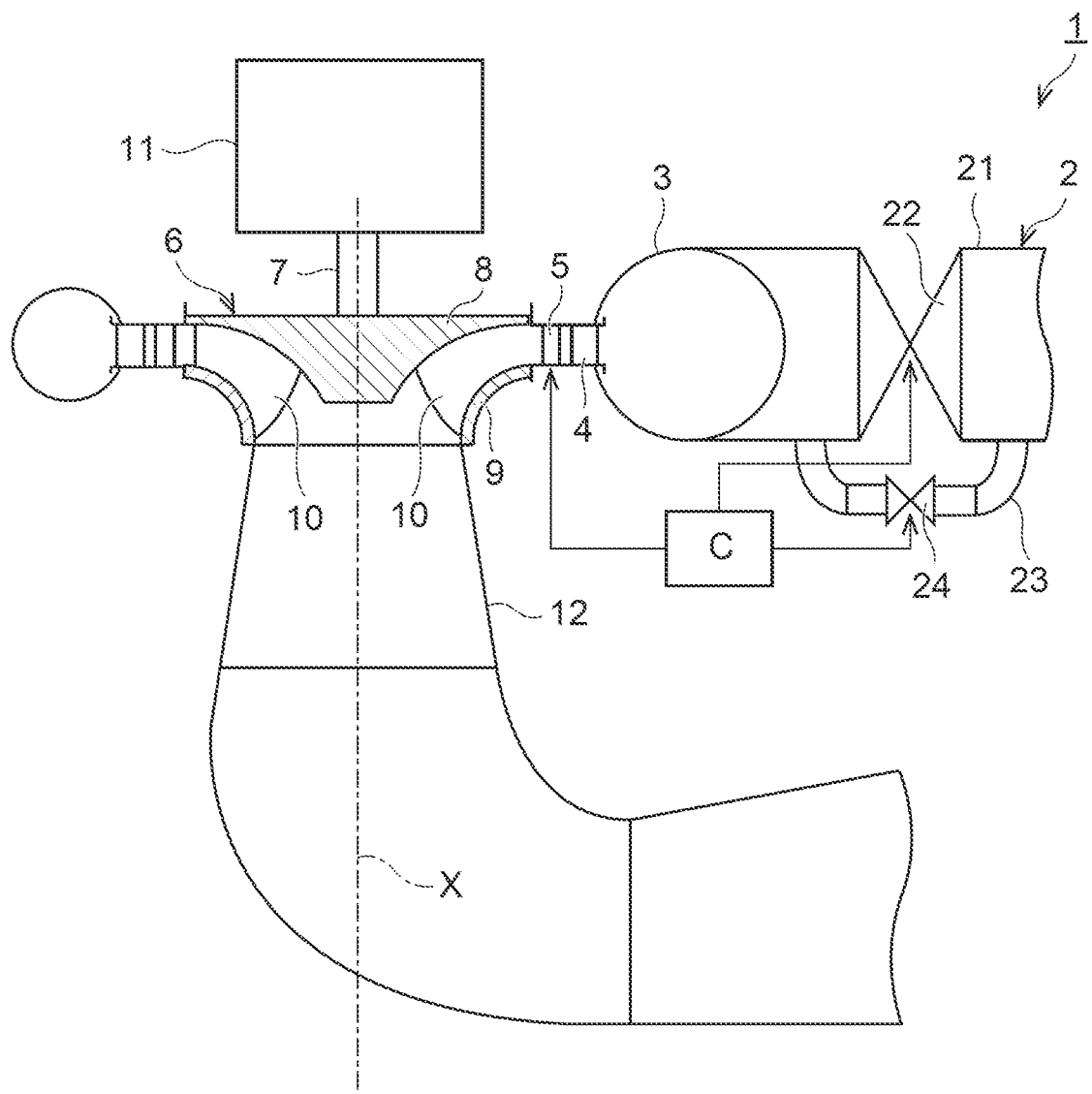
FIG. 1 is a meridional cross-sectional view of a Francis turbine according to an embodiment.
Figure 2:
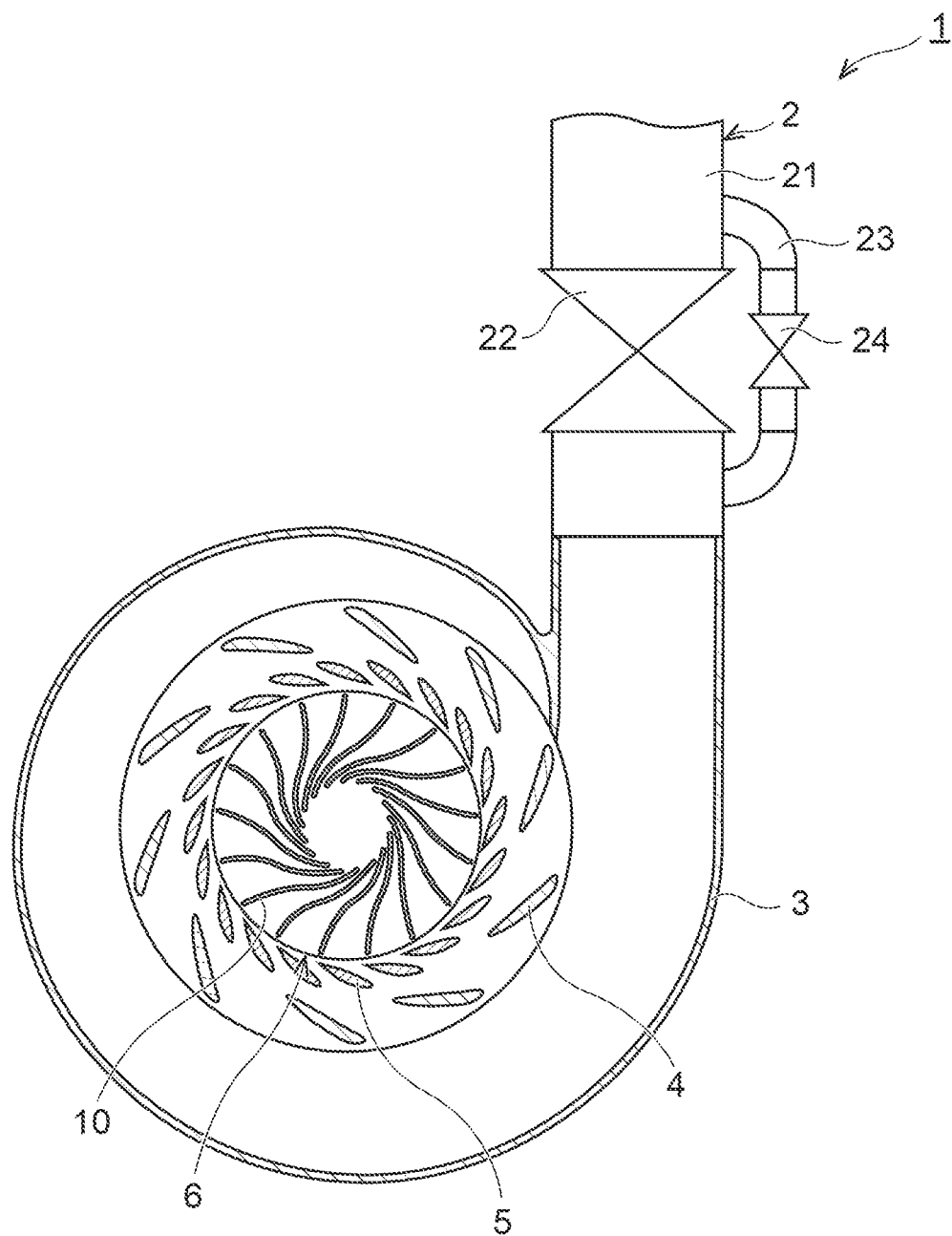
FIG. 2 is a top cross-sectional view of the Francis turbine shown in FIG. 1.

The Francis turbine according to the embodiment is described by means of FIGS. 1 and 2. Herebelow, the embodiment is described in line with a water flow when the turbine is operated.

As shown in FIGS. 1 and 2, a Francis turbine 1 comprises an inlet system 2, a casing 3, a plurality of stay vanes 4, a plurality of guide vanes 5 and a runner 6.

The inlet system 2 is configured to guide water from an upper reservoir, not shown, to the casing 3. The inlet system 2 has an inlet pipe 21, an inlet valve 22 provided to the inlet pipe 21, a bypass pipe 23 bypassing the inlet valve 22 and a bypass valve 24 provided to the bypass pipe 23.

The inlet pipe 21 is connected to a penstock extending from the upper reservoir, not shown, and the casing 3. The inlet pipe 21 is configured to allow water from the not-shown upper reservoir to flow therethrough so as to guide the water to the casing 3.

The inlet valve 22 is provided to the inlet pipe 21. The inlet valve 22 is configured to allow the water flow in the inlet pipe 21 when opened and to block the water flow in the inlet pipe 21 when closed. When the Francis turbine 1 is at rest, the inlet valve 22 is closed. On the other hand, when the Francis turbine 1 is in operation, the inlet valve 22 is opened. The opening and closing of the inlet valve 22 may be controlled by a control unit C described below.

The bypass pipe 23 is connected to a part of the inlet pipe 21, which is upstream of the inlet valve 22, and to a part of the inlet pipe 21, which is downstream of the inlet valve 22. The bypass valve 23 is configured to bypass the inlet valve 22 and to guide the water to the casing 3.

The bypass valve 24 is provided to the bypass pipe 23. The bypass valve 24 is configured to allow the water flow in the bypass pipe 23 when opened and to block the water flow in the bypass pipe 23 when closed. When the Francis turbine 1 is at rest, the bypass valve 24 is closed. On the other hand, when the Francis turbine 1 is in operation, the bypass valve 24 is opened. The opening and closing of the bypass valve 24 may be controlled by the control unit C described below.

The casing 3 is formed in a spiral shape. The casing 3 is configured such that the water from the inlet system 2 flows into the casing 3 to flow therethrough. The casing 3 is provided therein with the plurality of stay vanes 4, the plurality of guide vanes 5 and the runner 6.

The stay vanes 4 are provided inward with respect to the casing 3. The stay vanes 4 are configured to guide the water having flown into the casing 3 to the guide vanes 5 and the runner 6. As shown in FIG. 2, the stay vanes 4 are arranged at predetermined circumferential intervals therebetween. A flow path through which water flows is formed between the stay vanes 4.

The guide vanes 5 are provided inward with respect to the stay vanes 4. The guide vanes 5 are configured to guide water having flown thereinto to the runner 6. As shown in FIG. 2, the guide vanes 5 are arranged at predetermined circumferential intervals therebetween. A flow path through which water flows is formed between the guide vanes 5. Each guide vane 5 is configured to be rotatable, whereby a flow rate of water to be guided to the runner 6 can be regulated by rotating the guide vanes 5 to vary an opening G. The opening G of the guide vanes 5 may be controlled by the control unit C described below.

The runner 6 is provided inward with respect to the guide vanes 5. The runner 6 is configured to be rotatable about a rotation axis X with respect to the casing 3, and is driven in rotation by the water flowing thereinto from the guide vanes 5. The runner 6 has a crown 8 connected to a main shaft 7, a band 9 provided to an outer circumferential side of the crown 8 and a plurality of runner blades 10 provided between the crown 8 and the band 9. As shown in FIG. 2, the runner blades 10 are arranged at predetermined circumferential intervals therebetween. Each runner blade 10 is joined to the crown 8 and the band 9. A flow path (inter-blade flow path) through which water flows is formed between the runner blades 10. Water from the guide vanes 5 flows through the respective flow paths. The respective runner blades 10 receive a pressure from the water, so that the runner 6 is driven in rotation. Thus, energy of the water flowing into the runner 6 is converted to rotational energy.

A generator 11 is connected to the runner 6 via the main shaft 7. The generator 11 is configured to receive the rotational energy transmitted from the runner 6 to generate electricity when the turbine is in operation.

A draft tube 12 is provided downstream of the runner 6. The draft tube 12 is connected to the not-shown lower reservoir or a tailrace. The water having driven the runner 6 in rotation recovers a pressure in the draft tube 12 and is discharged therefrom to the lower reservoir or the tailrace.

The generator 11 may function as an electric motor and may be configured to be supplied with electric power to drive the runner 6 in rotation. In this case, water in the lower reservoir can be sucked up through the draft tube 12 so as to be discharged to the upper reservoir, whereby the Francis turbine 1 can be used as a pump turbine for a pumping operation. At this time, the opening G of the guide vanes 5 is varied to have a suitable pumping amount depending on a pump head.

The Francis turbine 1 according to the embodiment also comprises the control unit C.

The control unit C is configured to be capable of controlling the inlet valve 22, the bypass valve 24 and the guide vanes 5 described above. The control unit C controls the inlet valve 22, the bypass valve 24 and the guide vanes 5 to perform, upon startup of the Francis turbine 1, a bypass-valve opening step described below, an inlet-valve opening step described below, a first rotation-speed increasing step described below and a second rotation-speed increasing step described below. More specifically, in the bypass-valve opening step, the control unit C controls the bypass valve 24 to open the bypass valve 24. Then, in the inlet-valve opening step, the control unit C controls the inlet valve 22 to open the inlet valve 22. After that, in the first rotation-speed increasing step, the control unit C controls the guide vanes 5 to increase a rotation speed N of the runner 6 by opening the guide vanes 5 at an opening G1 that is 50% or more of a maximum opening G0 before a flow velocity of a below-described swirling flow 31 reaches 90 m/sec. Thereafter, in the second rotation-speed increasing step, the control unit C controls the guide vanes 5 to further increase the rotation speed N of the runner 6 to reach a rated rotation speed N0 by opening the guide vanes 5 at an opening G2 that is less than 50% of the maximum opening G0.

Next, a startup method of a Francis turbine according to the embodiment is described with reference to FIGS. 3 to 7.

Figure 3:
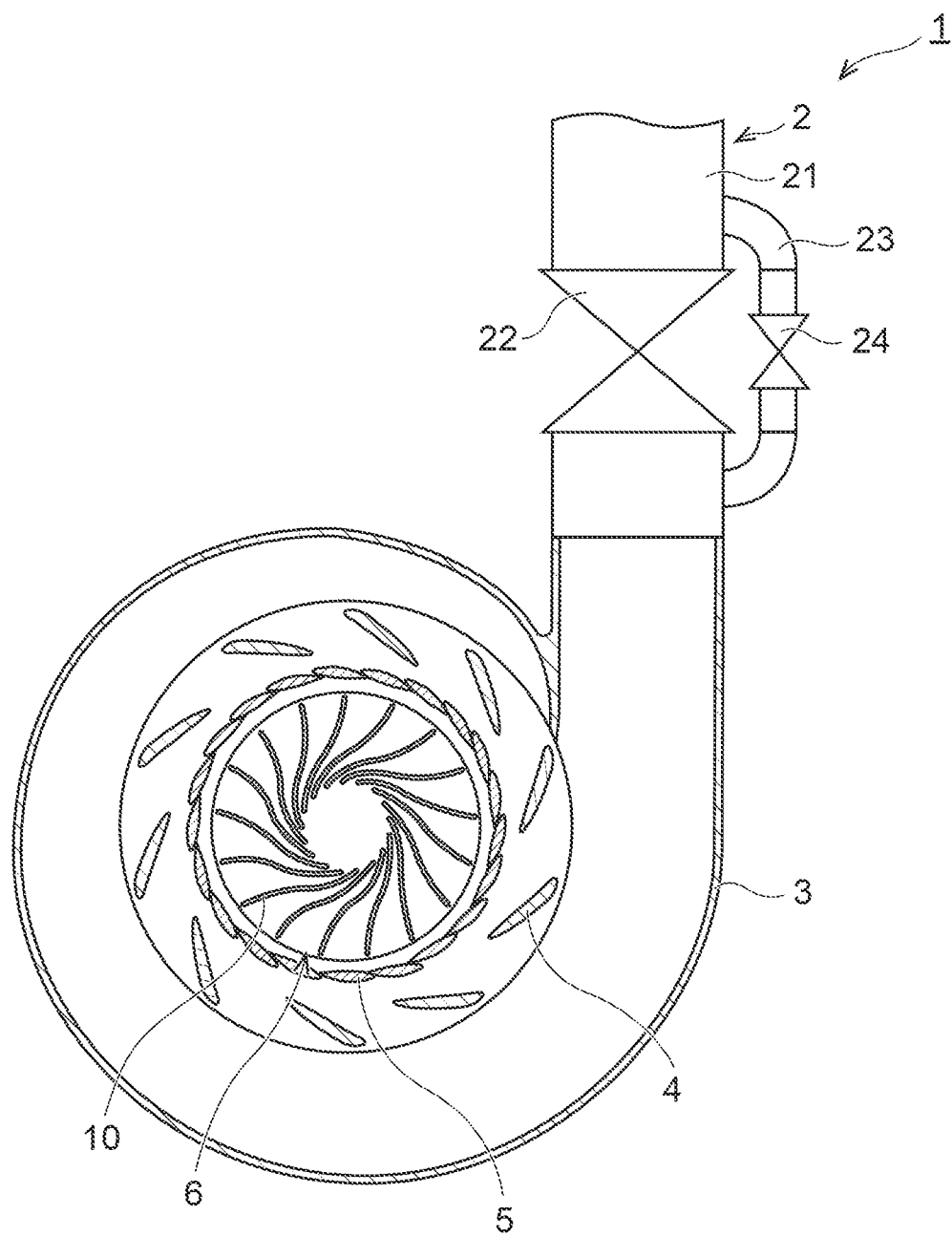
FIG. 3 is a top cross-sectional view of the Francis turbine at rest, for explaining a startup method of a Francis turbine according to the embodiment.

The startup method of the Francis turbine 1 according to the embodiment comprises a bypass-valve opening step of opening the bypass valve 24, an inlet-valve opening step of opening the inlet valve 22, a first rotation-speed increasing step of increasing a rotation speed N of the runner 6 and a second rotation-speed increasing step of further increasing the rotation speed N of the runner 6 to reach a rated rotation speed N0. As shown in FIG. 3, when the Francis turbine 1 is at rest, the inlet valve 22, the bypass valve 24 and the guide vanes 5 are closed.

In this state, the bypass-valve opening step is performed. In this bypass-valve opening step, the bypass valve 24 is opened with the inlet valve 22 and the guide vanes 5 closed. This allows water from the upper reservoir to flow from the inlet pipe 21 to the bypass pipe 23 so as to be guided into the casing 3 through the bypass valve 24. Thus, a pressure of the water in the casing 3 increases, so that a pressure difference between the upstream side of the inlet valve and the inside of the casing decreases.

After the bypass-valve opening step, the inlet-valve opening step is performed. In this inlet-valve opening step, the inlet valve 22 is opened with the bypass valve 24 opened and the guide vanes 5 closed. Thus, a large amount of water is guided from the upper reservoir into the casing 3.

Figure 4:
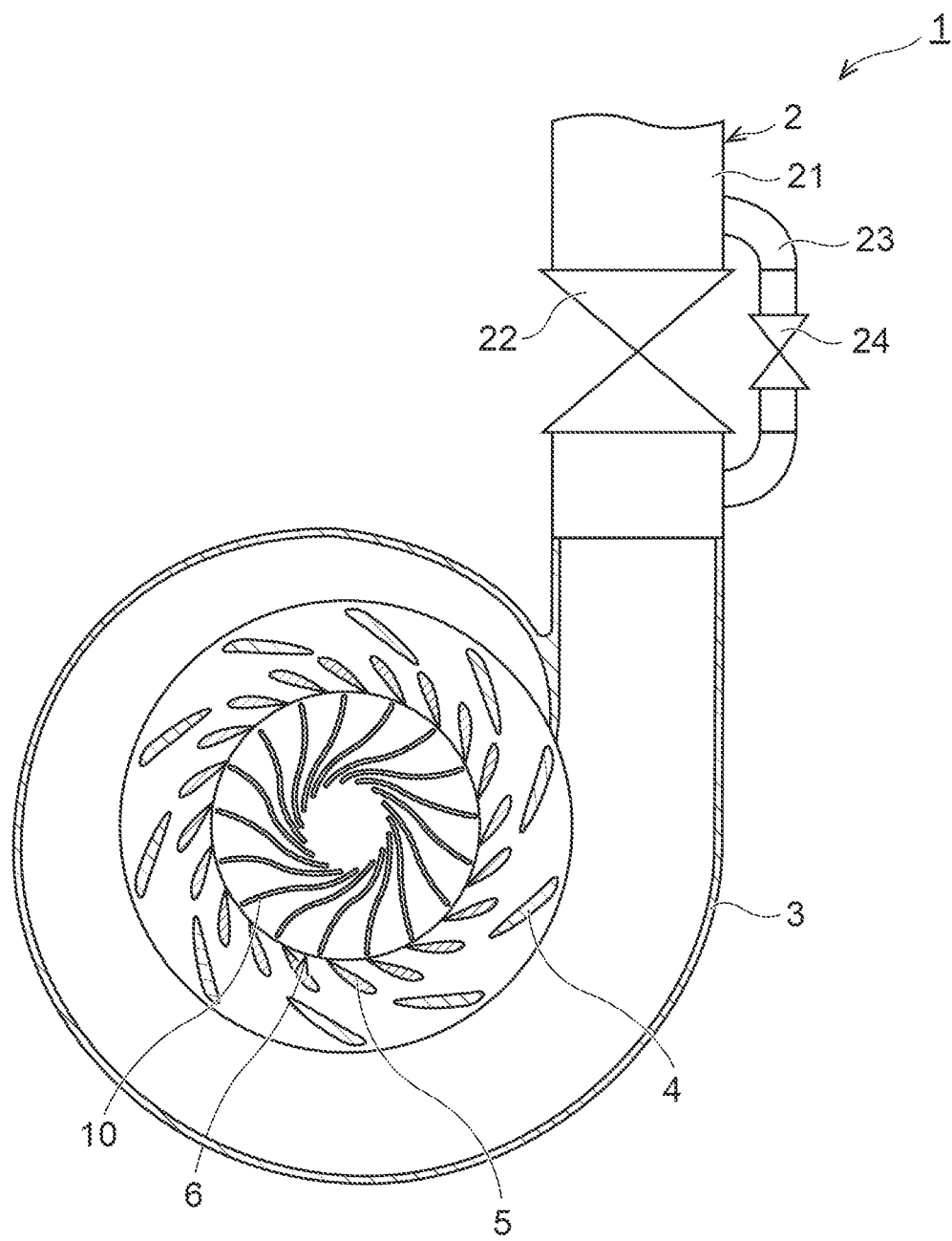
FIG. 4 is a top cross-sectional view for explaining a first rotation-speed increasing step in the startup method of a Francis turbine according to the embodiment.

After the inlet-valve opening step, the first rotation-speed increasing step is performed. In this first rotation-speed increasing step, a rotation speed N of the runner 6 is increased by opening the guide vanes 5 at an opening G1 (startup opening G1) that is 50% or more of a maximum opening G0 (mechanical maximum opening), as shown in FIG. 4, with the inlet valve 22 and the bypass valve 24 opened. The guide vanes 5 are opened at the opening G1 before a flow velocity of the below-described swirling flow 31 reaches 90 m/sec. The first rotation-speed increasing step includes an opening increasing step of increasing the opening G of the guide vanes 5 up to the startup opening G1 and a startup-opening maintaining step of maintaining the opening G of the guide vanes 5 at the startup opening G1.

Figure 5A:
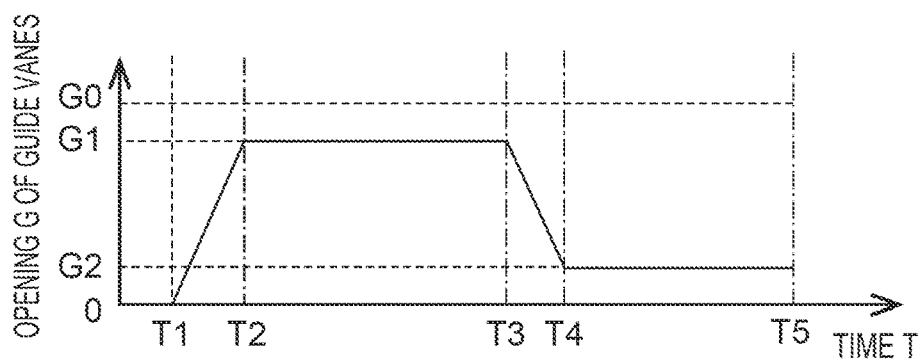
FIG. 5A is a time diagram showing an opening of guide vanes in the startup method of a Francis turbine according to the embodiment.
Figure 5B:
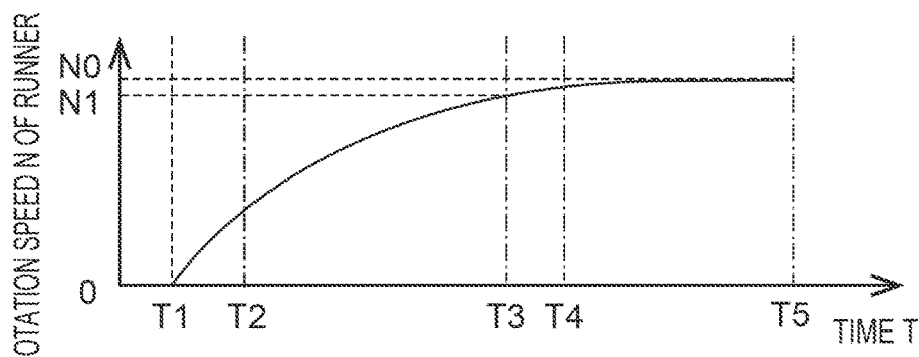
FIG. 5B is a time diagram showing a rotation speed of a runner in the startup method of a Francis turbine according to the embodiment.

FIG. 5A shows an example of a time diagram showing the opening of the guide vanes 5. FIG. 5B shows an example of a time diagram showing the rotation speed N of the runner 6. In the graph of FIG. 5A, the horizontal axis indicates a time T, and the vertical axis indicates the opening G of the guide vanes 5. In the graph of FIG. 5B, the horizontal axis indicates the time T, and the vertical axis indicates the rotation speed N of the runner 6.

In the first rotation-speed increasing step, as shown in FIGS. 5A and 5B, the opening increasing step is performed from a time T1 to a time T2. In this step, the opening G of the guide vanes 5 is increased from 0% (closed state) up to the startup opening G1 by rotating the guide vanes 5 to open. This allows the water having flown into the casing 3 to begin to flow into the runner 6 through the respective flow paths between the guide vanes 5. At the time T2, a flow velocity of the below-described swirling flow 31 has not yet reached 90 m/sec.

Then, as shown in FIGS. 5A and 5B, the startup-opening maintaining step is performed from the time T2 to a time T3. In this step, the opening G of the guide vanes 5 is maintained at the startup opening G1. During this step, the water having flown into the casing 3 continues flowing into the runner 6 through the respective flow paths between the guide vanes 5. The water having flown into the runner 6 flows through the respective flow paths between the runner blades 10. The runner blades 10 receive a pressure from the water flowing through these flow paths, so that the runner 6 is driven in rotation to increase the rotation speed N of the runner 6. Thus, as shown in FIG. 5B, the rotation speed N of the runner 6 can be increased up to a predetermined target rotation speed N1 at the time T3. The target rotation speed N1 is smaller than the rated rotation speed N0 (goal rotation speed to be accomplished), and may be, for example, 20% or more and 95% or less of the rated rotation speed N0 of the runner 6.

Figure 6:
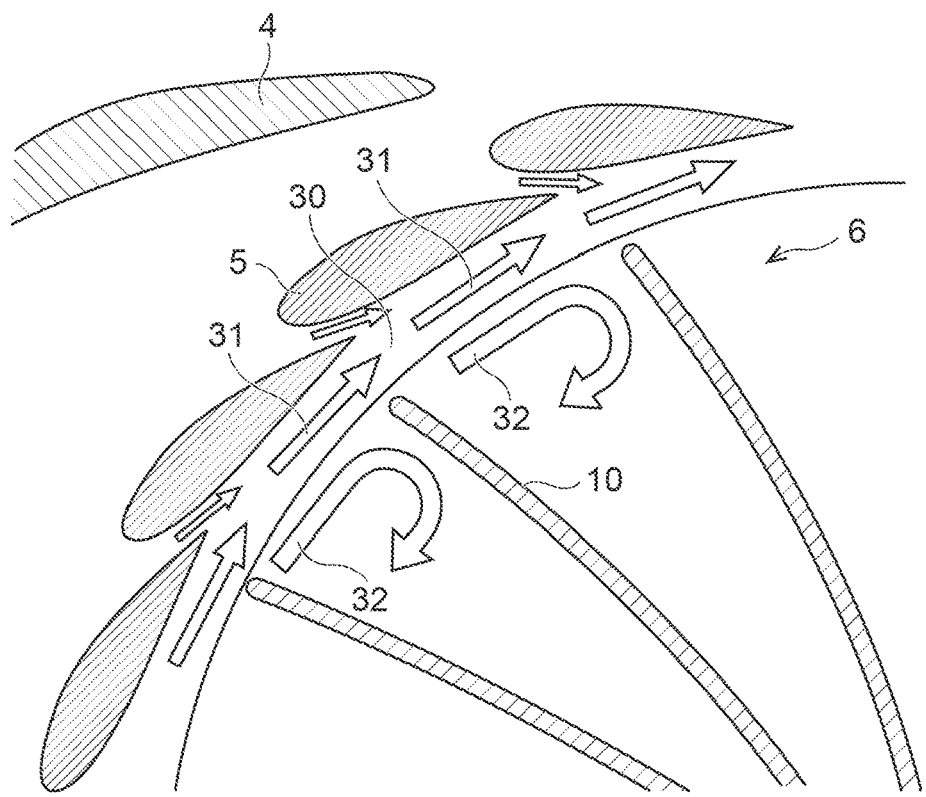
FIG. 6 is a partially enlarged top cross-sectional view showing a water flow when guide vanes are opened at a startup opening in a general startup method of a Francis turbine.

Generally, upon startup of the Francis turbine 1, the guide vanes 5 are opened at an opening of less than 50% of the maximum opening G0, e.g., at an opening of 10% or more and 20% or less of the maximum opening G0. In this case, as shown in FIG. 6, an annular flow path 30 may be formed between the guide vanes and the runner 6 in the radial direction. Then, the water having flown through the respective flow paths between the guide vanes 5 may flow through the annular flow path 30, creating swirling flow 31 around the runner 6. When the swirling flow 31 collides with the runner blade 10, a separation flow 32 may occur. Particularly when a flow velocity of the swirling flow 31 is 90 m/sec or more, a strong separation flow 32 is likely to occur. At this time, a pressure inside the runner 6 may decrease down to a saturated water vapor pressure or below. This causes the water to evaporate, so that the water vapor bubbles are generated in the water. At the moment when the water vapor in the water vapor bubbles condenses, the pressure may abruptly increase. This may damage the runner 6 because an impact load may be applied to the runner 6.

Figure 7:
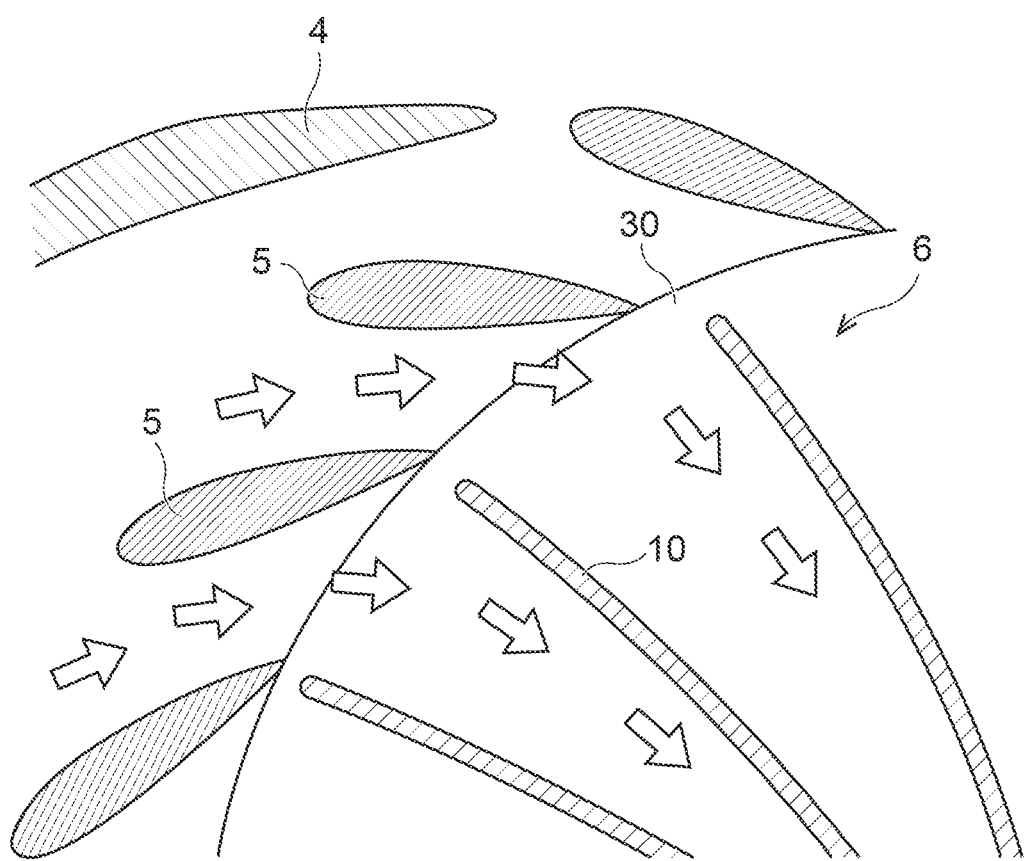
FIG. 7 is a partially enlarged top cross-sectional view showing a water flow when guide vanes are opened at a startup opening in the startup method of a Francis turbine according to the embodiment.

On the other hand, in the embodiment, upon startup of the Francis turbine 1, the guide vanes 5 are opened at the startup opening G1 that is 50% or more of the maximum opening G0 before a flow velocity of the swirling flow 31 reaches 90 m/sec. Thus, as shown in FIG. 7, a radial distance between the rotated guide vane 5 and the runner 6 can be made small, whereby a width of the annular flow path 30 can be narrowed. Namely, the annular flow path 30 can be blocked by the guide vanes 5 before a flow velocity of the swirling flow 31 reaches 90 m/sec. This can suppress the water having flown through the respective flow paths between the guide vanes 5 from flowing through the annular flow path 30. Thus, as shown by thick arrows in FIG. 7, the water can smoothly flow through the respective flow paths between the runner blades 10. This suppresses development of the swirling flow 31, and also suppresses generation of the separation flow 32. As a result, it can be suppressed that the impact load caused by the separation flow 32 is applied to the runner 6, and the damage to the runner 6 can be suppressed.

After the first rotation-speed increasing step, the second rotation-speed increasing step is performed. In this second rotation-speed increasing step, the rotation speed N of the runner 6 is further increased to reach the rated rotation speed N0 by opening the guide vanes 5 at the opening G2 (no-load opening G2) that is less than 50% of the maximum opening G0. The second rotation-speed increasing step includes an opening decreasing step of decreasing the opening G of the guide vanes 5 down to the no-load opening G2 and a no-load-opening maintaining step of maintaining the opening G of the guide vanes 5 at the no-load opening G2.

In the second rotation-speed increasing step, as shown in FIGS. 5A and 5B, the opening decreasing step is performed from the time T3 to a time T4. In this step, the opening G of the guide vanes 5 is decreased from the startup opening G1 down to the no-load opening G2 by rotating the guide vanes 5 to close.

Then, as shown in FIGS. 5A and 5B, the no-load-opening maintaining step is performed from the time T4 to a time T5. In this step, the opening G of the guide vanes 5 is maintained at the no-load opening G2. During this step, the runner 6 is driven in rotation by the water flowing into the runner 6, so that the rotation speed N of the runner 6 further increases. As shown in FIG. 5B, this enables the rotation speed N of the runner 6 to reach the rated rotation speed N0 at the time T5.

As described above, the no-load opening G2 is an opening that is less than 50% of the maximum opening G0. More specifically, the no-load opening G2 may be an opening that is 5% or more and 15% or less of the maximum opening G0.

In the aforementioned bypass-valve opening step, the inlet-valve opening step, the first rotation-speed increasing step and the second rotation-speed increasing step, the opening and closing of the inlet valve 22, the opening and closing of the bypass valve 24 and the regulation of the opening G of the guide vanes 5 may be performed by the control unit C. However, they may be manually operated by an operator, instead of the control unit C.

In this manner, the rotation speed N of the runner 6 reaches the rated rotation speed NO, and the Francis turbine 1 according to the embodiment is started up. Thereafter, the Francis turbine 1 performs a normal operation (load operation), in which rotational energy of the runner 6 is transmitted to the generator 11 and the generator 11 generates electricity.

According to the embodiment, in the first rotation-speed increasing step when the Francis turbine 1 is started up, the guide vanes 5 are opened at the startup opening G1 that is 50% or more of the maximum opening G0 before a flow velocity of the swirling flow 31 reaches 90 m/sec. Thus, the annular flow path 30 can be blocked by the rotated guide vanes 5 before a flow velocity of the swirling flow 31 reaches 90 m/sec. This can suppress the water having flown through the respective flow paths between the guide vanes 5 from flowing through the annular flow path 30, and can suppress development of the swirling flow 31. Thus, generation of the separation flow 32 can be suppressed. As a result, it can be suppressed that the impact load caused by the separation flow 32 is applied to the runner 6, and the damage to the runner 6 can be suppressed. In addition, by opening the guide vanes 5 at the opening G1 that is 50% or more of the maximum opening G0, a flow rate of the water flowing into the runner 6 can be increased. This enables the rotation speed N of the runner 6 to rapidly increase, resulting in reduction of a startup time of the Francis turbine 1.

First Modification

The aforementioned embodiment shows the example in which the first rotation-speed increasing step is performed after the inlet-valve opening step. However, not limited thereto, the first rotation-speed increasing step may be performed before the bypass-valve opening step. Namely, in the startup method of the Francis turbine 1, the bypass-valve opening step, the inlet-valve opening step, the first rotation-speed increasing step and the second rotation-speed increasing step are performed in this order. However, the first rotation-speed increasing step, the bypass-valve opening step, the inlet-valve opening step and the second rotation-speed increasing step may be performed in this order.

In this case, in the first rotation-speed increasing step, the guide vanes 5 are opened at the startup opening G1 that is 50% or more of a maximum opening G0 with the inlet valve 22 and the bypass valve 24 closed. Thus, water stored inside the casing 3 when the Francis turbine 1 is at rest is guided to the runner 6. The runner blades 10 receive a pressure from the water, so that the runner 6 is driven in rotation. Thus, the rotation speed N of the runner 6 increases.

Then, in the bypass-valve opening step, the bypass valve 24 is opened with the inlet valve 22 closed and the guide vanes 5 opened. Thus, water from the upper reservoir flows from the inlet pipe 21 to the bypass pipe 23 so as to be guided into the casing 3 through the bypass valve 24. Thus, a pressure of the water in the casing 3 increases, so that a pressure difference between the upstream side of the inlet valve and the inside of the casing decreases.

After that, in the inlet-valve opening step, the inlet valve 22 is opened with the guide vanes 5 and the bypass valve 24 opened. Thus, a large amount of water is guided from the upper reservoir into the casing 3. The water having flown into the casing 3 flows through the respective flow paths between the guide vanes 5 so as to be guided to the runner 6. The runner blades 10 receive a pressure from the water, so that the runner 6 is driven in rotation. Thus, the rotation speed N of the runner 6 further increases.

Then, in the second rotation-speed increasing step, the rotation speed N of the runner 6 is further increased to reach the rated rotation speed NO by opening the guide vanes 5 at the no-load opening G2 that is less than 50% of the maximum opening G0.

As described above, in a case where the first rotation-speed increasing step is performed before the bypass-valve opening step, development of the swirling flow 31 can be suppressed by opening the guide vanes 5 at the startup opening G1 that is 50% or more of the maximum opening G0 before a flow velocity of the swirling flow 31 reaches 90 m/sec in the first rotation-speed increasing step. Thus, generation of the separation flow 32 can be suppressed. As a result, it can be suppressed that the impact load caused by the separation flow 32 is applied to the runner 6, and the damage to the runner 6 can be suppressed.

Second Modification

In the aforementioned embodiment, the first rotation-speed increasing step may be performed between the bypass-valve opening step and the inlet-valve opening step. Namely, in the startup method of the Francis turbine 1, the bypass-valve opening step, the first rotation-speed increasing step, the inlet-valve opening step and the second rotation-speed increasing step may be performed in this order.

In this case, in the bypass-valve opening step, the bypass valve 24 is opened with the inlet valve 22 and guide vanes 5 closed. Thus, water from the upper reservoir flows from the inlet pipe 21 to the bypass pipe 23 so as to be guided into the casing 3 through the bypass valve 24. Thus, a pressure of the water in the casing 3 increases, so that a pressure difference between the upstream side of the inlet valve and the inside of the casing decreases.

Then, in the first rotation-speed increasing step, the guide vanes 5 are opened at the startup opening G1 that is 50% or more of a maximum opening G0 with the inlet valve 22 closed and the bypass valve 24 opened. Thus, water stored inside the casing 3 when the Francis turbine 1 is at rest is guided to the runner 6. The runner blades 10 receive a pressure from the water, so that the runner 6 is driven in rotation. Thus, the rotation speed N of the runner 6 increases.

After that, in the inlet-valve opening step, the inlet valve 22 is opened with the bypass valve 24 and the guide vanes 5 opened. Thus, a large amount of water is guided from the upper reservoir into the casing 3. The water having flown into the casing 3 flows through the respective flow paths between the guide vanes 5 so as to be guided to the runner 6. The runner blades 10 receive a pressure from the water, so that the runner 6 is driven in rotation. Thus, the rotation speed N of the runner 6 further increases.

In the second rotation-speed increasing step, the rotation speed N of the runner 6 is further increased to reach the rated rotation speed NO by opening the guide vanes 5 at the no-load opening G2 that is less than 50% of the maximum opening G0.

As described above, in a case where the first rotation-speed increasing step is performed between the bypass-valve opening step and the inlet-valve opening step, development of the swirling flow 31 can be suppressed by opening the guide vanes 5 at the startup opening G1 that is 50% or more of the maximum opening G0 before a flow velocity of the swirling flow 31 reaches 90 m/sec in the first rotation-speed increasing step. Thus, generation of the separation flow 32 can be suppressed. As a result, it can be suppressed that the impact load caused by the separation flow 32 is applied to the runner 6, and the damage to the runner 6 can be suppressed.

According to the embodiment described above, the damage to the runner can be suppressed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the invention.

In the aforementioned embodiment, the example in which the Francis turbine is a pump turbine that can perform a pumping operation. However, not limited thereto, the Francis turbine may be configured not to perform a pumping operation.

The invention claimed is:

1. A startup method of a Francis turbine comprising an inlet valve provided to an inlet pipe that guides water to a casing, a bypass valve provided to a bypass pipe that bypasses the inlet valve and guides water to the casing, and a guide vane capable of regulating a flow rate of water to be guided to a runner provided in the casing, the startup method comprising:
   a bypass-valve opening step of opening the bypass valve with the inlet valve closed;
   an inlet-valve opening step of opening the inlet valve after the bypass-valve opening step; and
   a first rotation-speed increasing step of increasing a rotation speed of the runner by opening the guide vane at an opening that is 50% or more of a maximum opening before a flow velocity of a swirling flow flowing around the runner reaches 90 m/sec.

2. The startup method of a Francis turbine according to claim 1, wherein the first rotation-speed increasing step is performed after the inlet-valve opening step.

3. The startup method of a Francis turbine according to claim 1, wherein the first rotation-speed increasing step is performed before the bypass-valve opening step.

4. The startup method of a Francis turbine according to claim 1, wherein the first rotation-speed increasing step is performed between the bypass-valve opening step and the inlet-valve opening step.

5. A Francis turbine comprising:
   a casing;
   an inlet pipe that guides water to the casing;
   an inlet valve provided to the inlet pipe;
   a bypass pipe that bypasses the inlet valve and guides water to the casing;
   a bypass valve provided to the bypass pipe;
   a runner provided in the casing;
   a guide vane capable of regulating a flow rate of water to be guided to the runner; and
   a control unit,
   wherein the control unit controls the inlet valve, the bypass valve and the guide vane to perform:
   a bypass-valve opening step of opening the bypass valve with the inlet valve closed;
   an inlet-valve opening step of opening the inlet valve after the bypass-valve opening step; and
   a first rotation-speed increasing step of increasing a rotation speed of the runner by opening the guide vane at an opening that is 50% or more of a maximum opening before a flow velocity of a swirling flow flowing around the runner reaches 90 m/sec.

* * * * *